United States Patent
Pawar et al.

(10) Patent No.: US 10,383,101 B1
(45) Date of Patent: Aug. 13, 2019

(54) DYNAMIC LINK ADAPTATION

(71) Applicant: Sprint Spectrum LP, Overland Park, KS (US)

(72) Inventors: Hemanth Pawar, Brambleton, VA (US); Krishna Sitaram, Chantilly, VA (US); Chunmei Liu, Great Falls, VA (US); Pratik Kothari, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 3 days.

(21) Appl. No.: 15/450,465

(22) Filed: Mar. 6, 2017

(51) Int. Cl.
*H04W 52/20* (2009.01)
*H04W 72/04* (2009.01)
*H04L 1/00* (2006.01)
*H04W 52/26* (2009.01)

(52) U.S. Cl.
CPC ......... *H04W 72/042* (2013.01); *H04L 1/0003* (2013.01); *H04L 1/0009* (2013.01); *H04W 52/20* (2013.01); *H04W 52/262* (2013.01); *H04W 52/267* (2013.01)

(58) Field of Classification Search
CPC . H04B 7/0632; H04L 5/0048; H04L 65/4061; H04W 52/0216; H04W 76/28; H04W 52/0258; H04W 72/0473
See application file for complete search history.

(56) References Cited

U.S. PATENT DOCUMENTS

| | | | |
|---|---|---|---|
| 6,374,117 B1* | 4/2002 | Denkert | H04L 1/0001 455/522 |
| 9,119,097 B2 | 8/2015 | Chatterjee et al. | |
| 9,674,837 B1* | 6/2017 | Sevindik | H04L 5/0035 |
| 2009/0028109 A1* | 1/2009 | Huang | H04L 12/189 370/330 |
| 2009/0041100 A1* | 2/2009 | Kimmich | H04L 1/0003 375/220 |
| 2015/0236814 A1 | 8/2015 | Liu et al. | |
| 2015/0304125 A1* | 10/2015 | Nee | H04L 5/16 370/294 |
| 2016/0072691 A1* | 3/2016 | Xu | H04B 7/18578 370/252 |
| 2016/0112969 A1* | 4/2016 | Zhou | H04W 24/08 370/252 |
| 2017/0208526 A1* | 7/2017 | Madan | H04W 36/32 |
| 2017/0289984 A1* | 10/2017 | Baligh | H04L 5/0094 |
| 2018/0145809 A1* | 5/2018 | Kwak | H04L 5/0048 |
| 2018/0227801 A1* | 8/2018 | Dudda | H04W 28/02 |
| 2018/0234207 A1* | 8/2018 | Clevorn | H04L 1/0026 |
| 2018/0359048 A1* | 12/2018 | Stephenne | H04L 1/0004 |

* cited by examiner

*Primary Examiner* — Asad M Nawaz
*Assistant Examiner* — Syed Ali

(57) ABSTRACT

Link adaptation for an uplink channel is dynamically performed based on changes in uplink resources in the wireless network, the changes based on frame configuration. If the ratio of uplink to downlink subframes in the new frame configuration is smaller, the throughput is increased by increasing a modulation and coding scheme of the uplink channel, and transmit power of wireless devices. If the ratio of uplink to downlink subframes is increased in the new frame configuration, the throughput is decreased, and the wireless device is instructed to transmit using reduced transmit power.

13 Claims, 5 Drawing Sheets

DYNAMIC LINK ADAPTATION

TECHNICAL BACKGROUND

As wireless networks evolve and grow in complexity, there are ongoing challenges in reliably communicating large amounts of data over the air interface(s) of the wireless network. For example, a wireless network may include one or more access nodes, such as base stations, for providing wireless voice and data service to numerous wireless devices in various coverage areas of the one or more access nodes. As is known to those having ordinary skill in the art, the air interface deployed by access nodes is typically divided into radio frames, each of which contains a plurality of subframes within a specified time period, each subframe containing resource elements organized into resource blocks. In time-duplexed long-term evolution (TD-LTE) networks, for instance, each subframe within a frame may be allocated towards uplink transmissions, i.e. transmissions from a wireless device to an access node, or downlink transmissions, i.e. transmissions from the access node to the wireless device. Various arrangements of uplink and downlink subframes in different ratios (along with certain special subframes) have been prescribed by LTE standards, and are hereinafter referred to as frame configurations. Consequently, to balance the requirements of the numerous wireless devices connecting to network nodes, different frame configurations (comprising different ratios of uplink-to-downlink resources) may be dynamically implemented within the wireless network. Such network-initiated variations in the availability of uplink resources can adversely affect wireless devices transmitting on the uplink channel by, for instance, interfering with uplink transmission power control (TPC) of these wireless devices.

OVERVIEW

Exemplary embodiments described herein include systems, methods, and processing nodes for dynamically performing dynamic link adaptation based on changes detected in an availability of uplink subframes within a frame configuration. An exemplary method for performing dynamic link adaptation includes determining a change in a wireless air interface deployed by an access node from a first frame configuration to a second frame configuration and adjusting a throughput for uplink data transmitted over the wireless air interface based on the change. The data is transmitted from a wireless device in communication with the access node. The method further includes instructing the wireless device to transmit the data at the adjusted throughput.

An exemplary system for performing dynamic link adaptation includes a processing node and a processor coupled to the processing node. The processor enables the processing node to perform operations including changing a frame configuration of an air interface from a first frame configuration to a second frame configuration. Each of the first and second frame configurations comprise different amounts of uplink resources. The operations further include determining that one or more wireless devices in communication with the access node are configured to transmit uplink data at a first throughput, and instructing the one or more wireless devices to transmit the uplink data at a second throughput that is different from the first throughput.

An exemplary processing node for performing dynamic link adaptation in a wireless network is configured to perform operations including determining that fewer uplink resources are available within an air interface deployed by an access node in the wireless network, incrementally increasing a throughput of uplink data transmitted from a wireless device communicatively coupled to the access node until a threshold error rate is reached, determining that greater uplink resources are available within the air interface, and incrementally decreasing the throughput of the uplink data until a minimum requirement is met.

DETAILED DESCRIPTION

In embodiments disclosed herein, link adaptation for an uplink channel in a wireless network is dynamically performed based on changes in uplink resources in the wireless network. A ratio of uplink resources to downlink resources may be altered by changes in frame configuration in an air interface of the wireless network. The frame configuration is one of a plurality of frame configurations, and each frame configuration comprises a data frame having a sequence of uplink and downlink subframes in a specified ratio for a fixed time interval, along with one or more special subframes. For numerous reasons, such as requirements of wireless devices on the wireless network, a frame configuration may be selected that has a different ratio of uplink subframes relative to downlink subframes than a frame configuration currently being used in the wireless network. Upon determining a change in frame configuration, a throughput for uplink data transmitted over the uplink channel is adjusted, and wireless devices are instructed to transmit uplink data at the adjusted throughput.

If the ratio of uplink subframes to downlink subframes in the second (i.e. new) frame configuration is smaller than the ratio of uplink subframes to downlink subframes in the first (i.e. original) frame configuration, the throughput is increased. Increasing the throughput may comprise increasing a modulation and coding rate or scheme of data transmitted on the uplink channel. Such an increase may increase the error rate. Therefore, the throughput may be incrementally increased until a threshold error rate is met. In some embodiments, the throughput is adjusted based on an error rate constraint as well as an application requirement of an application running on one or more wireless devices. In addition to the throughput being increased, the wireless device may further be instructed to transmit uplink data at an increased power, so as to enable the higher throughput. Conversely, if the ratio of uplink to downlink subframes in the second frame configuration is greater than the ratio of uplink to downlink subframes in the first frame configuration, the throughput is decreased, and the wireless device is instructed to transmit the data at the decreased throughput and using a reduced transmit power.

The operations disclosed herein may be performed by one or more of a serving access node, a controller node, or any other network node, alone or in any combination, as further described below with respect to the embodiments depicted in FIGS. 1-5.

Figure 1:
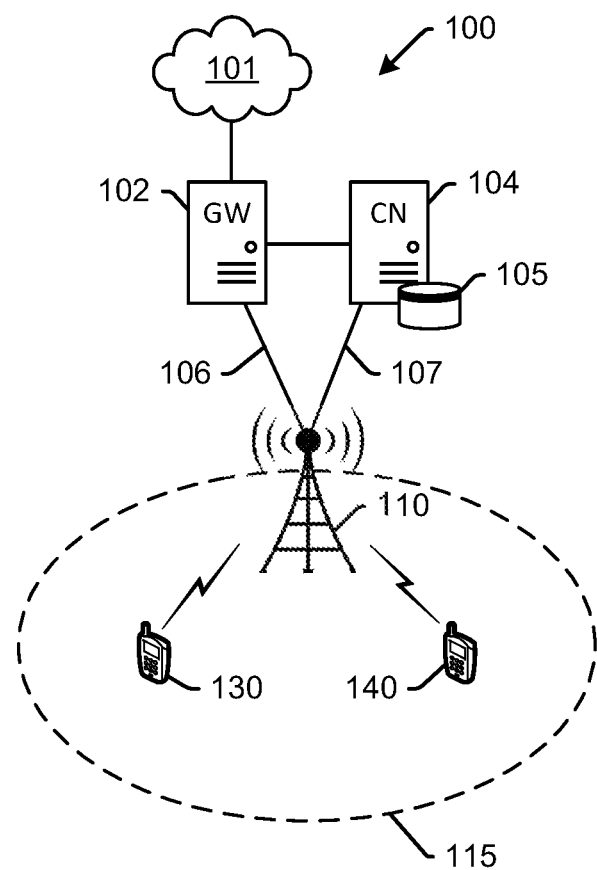
FIG. 1 depicts an exemplary system for performing dynamic link adaptation in a wireless network.

FIG. 1 depicts an exemplary system 100 for dynamic link adaptation. System 100 comprises a communication network 101, gateway node 102, controller node 104, access node 110, and wireless devices 130, 140. Access node 110 is illustrated as having a coverage area 115, with wireless devices 130, 140 being located within coverage area 115 and accessing network services directly from access node 110 over an air interface deployed by access node 110. It should be noted that although only access node 110 and wireless devices 130, 140 are shown in FIG. 1, any number and combination of access nodes and wireless devices is possible within system 100, without any material difference to the operations described herein.

In operation, one or more of access node 110, controller node 104, or any other network element in system 100 performs dynamic link adaptation for an uplink channel of a wireless air interface deployed by access node 110 based on changes in a ratio of uplink resources to downlink resources in the wireless air interface. The uplink channel may comprise uplink resources, i.e. physical resource blocks allocated towards a Physical Uplink Shared Channel (PUSCH). The changes to the ratio of uplink to downlink resources may arise as a result of changes in a frame configuration in system 100. The frame configuration is one of a plurality of frame configurations, and each frame configuration comprises a data frame having a sequence of uplink and downlink subframes in a specified ratio for a fixed time interval, along with one or more special subframes. For example, in a time division duplex (TDD) network, the system bandwidth is shared between uplink and downlink, with the sharing being performed by allotting different periods of time (e.g. transmission time intervals or TTIs) to uplink and downlink transmission. When using a TDD frame structure, an uplink subframe and a downlink subframe may be transmitted over the same frequency at different times. Moreover, different frame configurations comprise different ratios of uplink subframes and/or downlink subframes, as shown in Table 1 below. LTE standards have prescribed seven known frame configurations (FC0-FC6 in Table 1 below) that can be selected from at any time by a network node, such as an access node or controller node, as prescribed by LTE standards. In such a system, a data transmission frame (or simply "frame") is about 10 ms in duration and comprises 10 subframes, each of which is about 1 ms in duration. For example, a frame of 10 ms in duration may comprise a number of subframes of 1 ms in duration (i.e., TTIs), arranged in a sequence of uplink subframes and downlink subframes. In some embodiments, a special subframe may also be used, for instance, as a guard between an uplink subframe and a downlink subframe or for any other suitable purpose. In other embodiments, such as in an enhanced interference mitigation and traffic adaptation (eIMTA) system within an LTE network, a frame configuration may comprise one or more flexible subframes that can be dynamically adjusted to either be downlink, uplink, or special subframes. See, for instance, configuration FCn with flexible subframes (F) in Table 1.

TABLE 1

| Frame Config. | Frame Configurations |||||||||| 
| | Subframe (SF0-SF9) |||||||||| 
| (FC1-FCn) | SF0 | SF1 | SF2 | SF3 | SF4 | SF5 | SF6 | SF7 | SF8 | SF9 |
|---|---|---|---|---|---|---|---|---|---|---|
| FC0 | D | S | U | U | U | D | S | U | U | U |
| FC1 | D | S | U | U | D | D | S | U | U | D |
| FC2 | D | S | U | D | D | D | S | U | D | D |
| FC3 | D | S | U | U | U | D | D | D | D | D |
| FC4 | D | S | U | U | D | D | D | D | D | D |
| FC5 | D | S | U | D | D | D | D | D | D | D |
| FC6 | D | S | U | U | U | D | S | U | U | D |
| ... | | | | | ... | | | | | |
| FCn | D | S | U | F | F | D | S/D | F | F | F |

Each frame configuration in Table 1 comprises 10 subframes SF0-SF9, and each frame configuration FC0-FCn comprises a different ratio of downlink (D), uplink (U), and special (S) subframes. Other frame configurations may comprise various other sequences of special, downlink, and uplink subframes. For the purposes of the subject disclosure, a frame configuration is not limited to existing known frame configurations, but can be any sequence of uplink and downlink subframes that can be appreciated by those having ordinary skill in the art in light of this disclosure.

As described above, one or more of access node 110, controller node 104, or any other network element in system 100 detects changes in frame configuration, and performs dynamic link adaptation by adjusting a throughput and/or a power level for uplink data transmitted from one or more of wireless devices 130, 140 based on the changes. The changes in frame configuration may be performed for numerous reasons, such as for load balancing operations or other adjustments based on requirements of wireless devices 130, 140. A frame configuration may be selected that has a different ratio of uplink subframes relative to downlink subframes than a frame configuration currently being used in the wireless network. With respect to the frame configurations described in Table 1, for instance, if the current (i.e. first) frame configuration is FC1 (which has 4 uplink subframes), and if frame configuration FC2 (which has 2 uplink subframes) is selected, it may be determined that fewer uplink subframes relative to downlink subframes are available within system 100.

Upon determining such a change in frame configuration and/or availability of uplink resources, a throughput for uplink data transmitted over the uplink channel is adjusted, and wireless devices 130, 140 are instructed to transmit uplink data at the adjusted throughput. For example, if the ratio of uplink subframes to downlink subframes in the second (i.e. new) frame configuration is smaller than the ratio of uplink subframes to downlink subframes in the first (i.e. original) frame configuration, the throughput is increased. Prior to increasing the throughput, it may be determined that one or more of wireless devices 130, 140 are configured to transmit uplink data at a first throughput that is too low. For example, an application requirement may require a certain throughput. The first throughput may be insufficient for transmitting the uplink data in the second frame configuration. Therefore, the throughput is increased.

In addition to the throughput being increased, wireless devices 130, 140 may further be instructed to transmit uplink data at an increased power, so as to enable the higher throughput. Conversely, if the ratio of uplink to downlink subframes in the second frame configuration is greater than the ratio of uplink to downlink subframes in the first frame configuration, the throughput is decreased, and wireless devices 130, 140 are instructed to transmit the data at the decreased throughput and using a reduced transmit power.

Increasing the throughput may comprise increasing a modulation and coding rate or scheme of data transmitted on the uplink channel. For example, in LTE networks, it is possible to choose between three types of modulation schemes comprising variants of Quadrature Phase Shift Keying (QPSK, a form of Phase Shift Keying in which two bits are modulated at once), and Quadrature Amplitude Modulation (QAM, widely sued for data transmission as it enables better levels of spectral efficiency than other forms of modulation). The 3 types of modulation schemes can include, for instance, QPSK, 16QAM (4 bits per symbol), and 64QAM (6 bits per symbol). The exact LTE modulation format is generally chosen depending upon the prevailing conditions, such as a channel quality indicator (CQI). The lower forms of modulation, i.e. QPSK, do not require a large signal to noise ratio, while potentially being unable to send the data as fast or at a higher throughput. The higher-order modulations (16QAM and 64QAM) are used when there is a sufficient or threshold signal to noise ratio. Consequently, in some cases, higher-order modulations are subject to signal loss, as reflected by an error rate.

Therefore, an increase in throughput via selection of a higher-order modulation may increase the error rate, such as a block error rate (BLER), packet error rate (PER), or any other measurement of error. The error rate may be associated with an application requirement. In either case, the throughput may be incrementally increased until a threshold error rate is met. In some embodiments, the throughput is adjusted based on an error rate threshold/constraint as well as an application requirement of an application running on one or more of wireless devices 130, 140.

Access node 110 can be any network node configured to provide communication between wireless devices 130, 140 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In an exemplary embodiment, a macrocell access node can have a coverage area 115 in the range of approximately five kilometers to thirty-five kilometers and an output power in the tens of watts. In other embodiments, access node 110 can be a small access node including a microcell access node, a picocell access node, a femtocell access node, or the like such as a home NodeB or a home eNodeB device.

Figure 2:
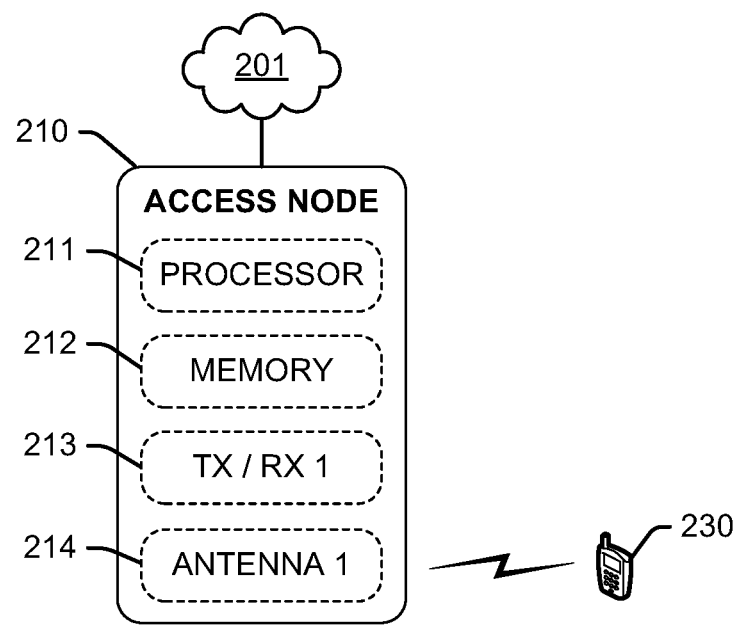
FIG. 2 depicts an exemplary access node for performing dynamic link adaptation in a wireless network.

Access node 110 can comprise a processor and associated circuitry to execute or direct the execution of computer-readable instructions to perform operations such as those further described in FIG. 2. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can each receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 130, 140 may be any device, system, combination of devices, or other such communication platform capable of communicating wirelessly with access node 110 using one or more frequency bands deployed therefrom. Each of wireless devices 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, 140. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as power and throughput capabilities of wireless devices 130, 140, predefined or dynamic thresholds, and associations thereof with frame configurations, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

FIG. 2 depicts an exemplary access node 210 which may comprise, for example, a macro access node as described with reference to FIG. 1. Access node 210 provides wireless device 230 with access to network services and applications on network 201, and enables communication therewith. Access node 210 is illustrated as comprising a processor 211, memory 212, transceiver 213, and antenna 214. Processor 211 executes instructions stored on memory 212, thereby enabling wireless communication with one or more wireless devices, such as wireless device 230, and access node 210 to perform the operations described herein and with respect to FIGS. 3 and 4.

Figure 3:
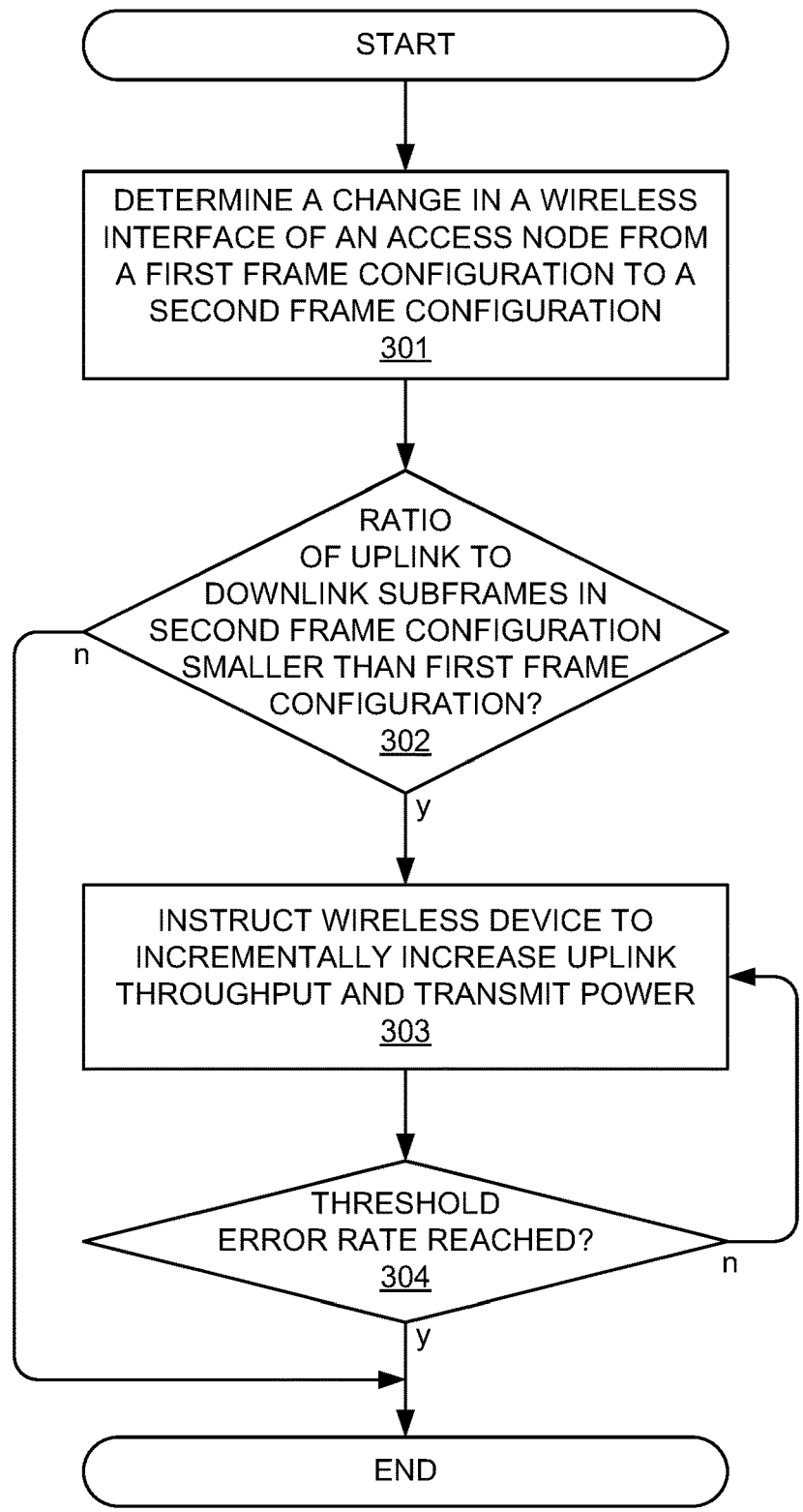
FIG. 3 depicts an exemplary method for performing dynamic link adaptation in a wireless network.

FIG. 3 depicts an exemplary method for dynamic link adaptation in a wireless network. The method of FIG. 3 may be implemented by an access node, such as access nodes 210, 120, controller node 104, or any other network node. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins at 301 with a determination of a change in frame configuration of a wireless interface of an access node. The frame configuration may change from a first, i.e. initial or default frame configuration, to a second frame configuration, i.e. a new frame configuration. The default and new frame configurations may be any from among a plurality of frame configurations available in the wireless network. Further, each of the plurality of frame configurations comprises a sequence of subframes in a defined order as further described herein and with respect to Table 1 above. The changes in frame configuration may be initiated by a network operator or network node for numerous reasons, including load balancing between uplink and downlink resource usage, and so on.

At 302, it is determined whether a ratio of uplink subframes relative to downlink subframes in the second frame configuration is smaller than a ratio of uplink subframes to downlink subframes in the first or initial frame configuration. In other words, it may be determined that a fewer amount of uplink resources (i.e. subframes) are available now than were previously available in the wireless network. As described herein, such a change negatively impacts performance of the uplink channel by limiting availability of uplink resources. If the amount (or relative ratio) of uplink subframes remains relatively stable, i.e. does not decrease with the change in frame configuration, then link adaptation may not be needed, and the method ends.

If, however, a negative change in frame configuration and/or availability of uplink resources is determined then, at 303, a throughput for uplink data transmitted over the uplink channel is increased, and wireless devices within the wireless network are instructed to transmit uplink data at the increased throughput. An optional step here is to determine whether or not the current throughput is too low for an application or other requirement. In either case, increasing the throughput may comprise increasing a modulation and coding rate or scheme (MCS) of data transmitted on the uplink channel. Such an increase may increase the error rate, such as a block error rate (BLER), packet error rate (PER), or any other measurement of error. The error rate may be associated with an application requirement. In either case, the throughput may be incrementally increased at 303, until a threshold error rate is met at 304. In addition to the throughput being increased at 303, the wireless devices may further be instructed to transmit uplink data at an increased power, so as to enable the incrementally higher throughput.

Figure 4:
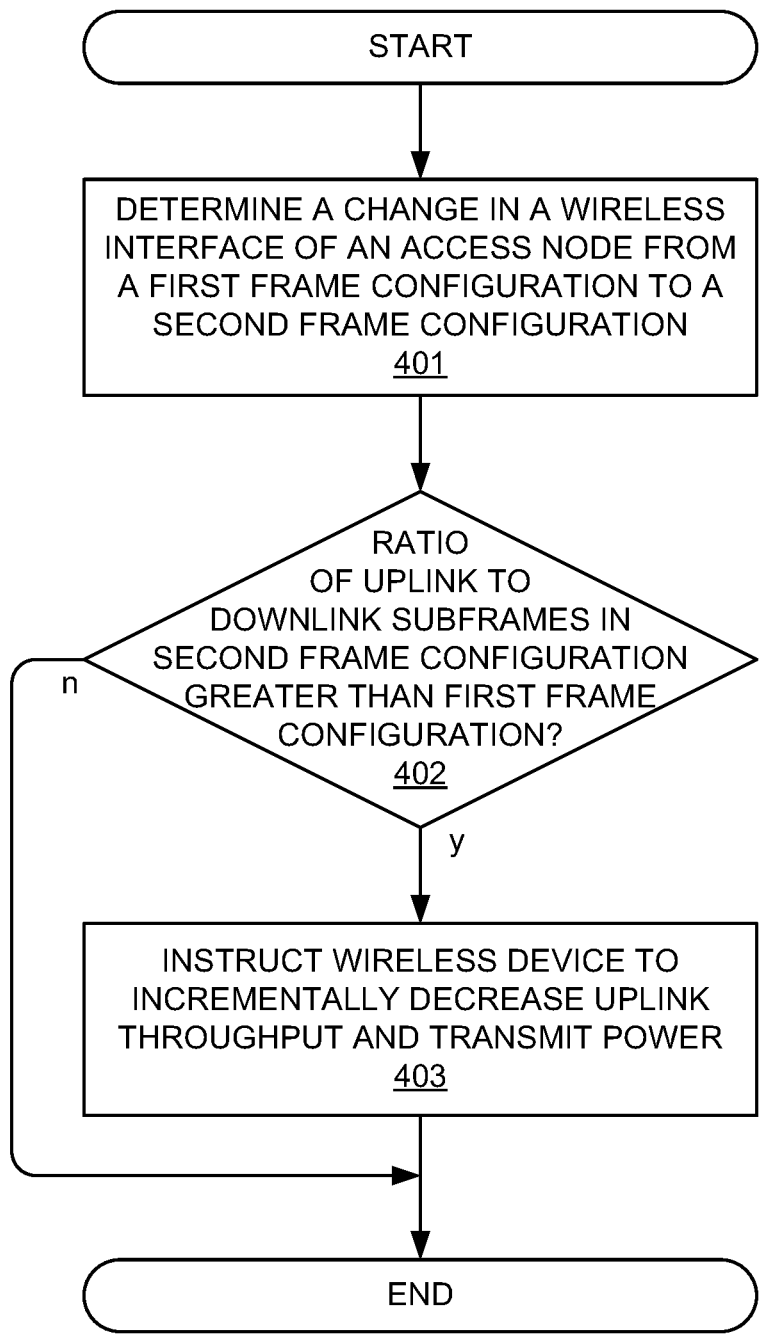
FIG. 4 depicts another exemplary method for performing dynamic link adaptation in a wireless network.

Alternatively or in addition, if the ratio of uplink to downlink subframes in the second frame configuration is greater than the ratio of uplink to downlink subframes in the first frame configuration, the throughput is decreased, as further described with respect to FIG. 4. Similar to the method of FIG. 3, the method of FIG. 4 may be implemented by an access node, such as access nodes 210, 120, controller node 104, or any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins at 401 with a determination of a change in frame configuration of a wireless interface of an access node. The frame configuration may change from a first, i.e. initial or default frame configuration, to a second frame configuration, i.e. a new frame configuration. Alternatively, or in addition, the frame configuration may have changed back to a default (second) frame configuration from a new (first) frame configuration. In either case, the default and new frame configurations may be any from among a plurality of frame configurations available in the wireless network. Further, each of the plurality of frame configurations comprises a sequence of subframes in a defined order as further described herein and with respect to Table 1 above. The changes in frame configuration may be initiated by a network operator or network node for numerous reasons, including load balancing between uplink and downlink resource usage, and so on.

At 402, it is determined whether a ratio of uplink subframes relative to downlink subframes in the second frame configuration is greater than a ratio of uplink subframes to downlink subframes in the first or initial frame configuration. In other words, it may be determined that more uplink resources (i.e. subframes) are available now than were previously available in the wireless network. If the number (or relative ratio) of uplink subframes remains relatively stable, i.e. does not increase with the change in frame configuration, then link adaptation may not be needed, and the method ends. If, however, a positive change in frame configuration and/or availability of uplink resources is determined then, at 403, a throughput for uplink data transmitted over the uplink channel is decreased, and wireless devices within the wireless network are instructed to transmit uplink data at the decreased throughput. The reason for the decrease is that the positive change in uplink resource availability may not require such a high throughput, thereby allowing wireless devices to reduce their throughput and transmit power accordingly, thereby saving battery life and processing resources. An optional step here is to determine whether or not the current throughput is sufficient for an application or other requirement. In either case, decreasing the throughput may comprise decreasing a modulation and coding rate or scheme (MCS) of data transmitted on the uplink channel from, for example, a higher-order MCS to a lower-order MCS. Conversely, increasing the throughput may comprise increasing the MCS from a lower-order MCS to a higher-order MCS.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, controller node 104, and/or network 101.

Figure 5:
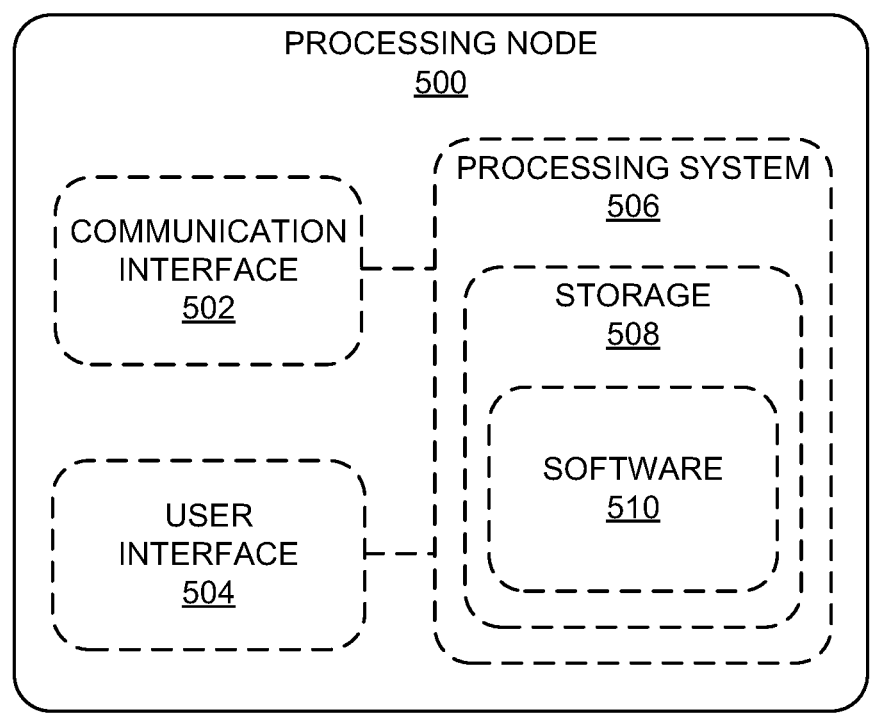
FIG. 5 depicts an exemplary processing node for performing dynamic link adaptation in a wireless network.

FIG. 5 depicts an exemplary processing node 500 for data transmission using frame reconfiguration. Processing node 500 comprises a communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. For example, storage 508 may include a buffer. Software 510 may include computer programs, firmware, or some other form of machine-readable instructions, including an operating system, utilities, drivers, network interfaces, applications, or some other type of software. For example, software 510 may include a module for performing dynamic link adaptation operations described herein. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing dynamic link adaptation, comprising:
    determining a change in a wireless air interface deployed by an access node from a first frame configuration to a second frame configuration, wherein the first frame configuration comprises a first ratio of uplink subframes to downlink subframes within a time period, the second frame configuration comprises a second ratio of uplink subframes to downlink subframes within the time period, and the second ratio is different from the first ratio, wherein the second ratio is smaller than the first ratio;
    adjusting a throughput for uplink data transmitted over the wireless air interface based on the change, wherein the uplink data is transmitted from a wireless device in communication with the access node, and wherein adjusting the throughput further comprises increasing a modulation and coding scheme (MCS) and a transmit power of the wireless device incrementally until a threshold error rate is met, wherein the MCS comprises Quadrature Phase Shift Keying (QPSK), 16-bit Quadrature Amplitude Modulation (16QAM), or 16-bit Quadrature Amplitude Modulation (16QAM); and
    instructing the wireless device to transmit the data at the adjusted throughput.

2. The method of claim 1, wherein the second ratio is larger than the first ratio, and wherein adjusting the throughput comprises decreasing the MCS and the transmit power.

3. A system for performing dynamic link adaptation, the system comprising:
    a processing node; and
    a processor coupled to the processing node, the processor for enabling the processing node to perform operations comprising:
        changing a frame configuration of an air interface from a first frame configuration to a second frame configuration, wherein the first frame configuration comprises a higher amount of uplink resources deployed by an access node[[ ]] than the second frame configuration;
        determining that one or more wireless devices in communication with the access node are configured to transmit uplink data at a first throughput; and
        instructing the one or more wireless devices to transmit the uplink data at a second throughput that is different from the first throughput,
        wherein instructing the one or more wireless devices to transmit the uplink data at the second throughput comprises increasing a modulation and coding scheme (MCS) and a transmit power of the one or more wireless devices incrementally until a threshold error rate is met, wherein the MCS comprises Quadrature Phase Shift Keying (QPSK), 16-bit Quadrature Amplitude Modulation (16QAM), or 16-bit Quadrature Amplitude Modulation (16QAM).

4. The system of claim 3, wherein the operations further comprise determining that the first throughput is insufficient for transmitting the uplink data using the second frame configuration.

5. The system of claim 4, wherein the second throughput is higher than the first throughput.

6. The system of claim 4, wherein determining that the first throughput is insufficient for transmitting the uplink data using the second frame configuration is based on an application requirement of the one or more wireless devices.

7. The system of claim 3, wherein the first frame configuration comprises a smaller amount of uplink resources than the second frame configuration.

8. The system of claim 7, wherein the second throughput is lower than the first throughput.

9. The system of claim 8, wherein the operations further comprise determining that the second throughput is sufficient for transmitting the uplink data using the second frame configuration.

10. A processing node for performing dynamic link adaptation in a wireless network, the processing node comprising a processor that is configured to perform operations comprising:
    determining that an air interface deployed by an access node in the wireless network is switched from using a first frame configuration to using a second frame configuration, wherein the second frame configuration comprises fewer uplink resources than the first frame configuration;
    incrementally increasing a modulation and coding scheme (MCS) and a transmit power level of uplink data transmitted from a wireless device communicatively coupled to the access node until a threshold error rate is reached, wherein the MCS comprises Quadrature Phase Shift Keying (QPSK), 16-bit Quadrature Amplitude Modulation (16QAM), or 16-bit Quadrature Amplitude Modulation (16QAM);
    determining that the air interface is switched from using the second frame configuration to using the first frame configuration; and
    incrementally decreasing the MCS and the transmit power level of the uplink data until a minimum requirement is met.

11. The processing node of claim 10, wherein incrementally increasing the MCS comprises instructing the wireless device to transmit the uplink data at a higher-order MCS, and incrementally decreasing the MCS comprises instructing the wireless device to transmit the uplink data at a lower-order MCS.

12. The processing node of claim 10, wherein the minimum requirement comprises an application requirement of an application on the wireless device.

13. The processing node of claim 10, wherein the threshold error rate comprises a block error rate.

* * * * *